(12) United States Patent
Green et al.

(10) Patent No.: US 10,482,143 B2
(45) Date of Patent: *Nov. 19, 2019

(54) RECOMMENDING OBJECTS TO A USER OF A SOCIAL NETWORKING SYSTEM BASED ON THE LOCATION OF THE USER

(71) Applicant: Facebook, Inc., Menlo Park, CA (US)

(72) Inventors: Bradley Ray Green, Snohomish, WA (US); James Wah Hou Wong, San Francisco, CA (US); Jinyi Yao, Issaquah, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/403,105

(22) Filed: Jan. 10, 2017

(65) Prior Publication Data

US 2017/0124207 A1    May 4, 2017

Related U.S. Application Data

(63) Continuation of application No. 14/296,369, filed on Jun. 4, 2014, now Pat. No. 9,563,709.

(51) Int. Cl.
*G06F 16/9535* (2019.01)
*G06Q 50/00* (2012.01)
(Continued)

(52) U.S. Cl.
CPC .... *G06F 16/9535* (2019.01); *G06F 16/24578* (2019.01); *G06F 16/29* (2019.01);
(Continued)

(58) Field of Classification Search
CPC ................. G06F 17/30867; G06F 16/9535
(Continued)

(56) References Cited

U.S. PATENT DOCUMENTS

| | | | |
|---|---|---|---|
| 2010/0179759 A1* | 7/2010 | Zheng | G01S 19/40 701/300 |
| 2012/0166532 A1 | 6/2012 | Juan et al. | |

(Continued)

OTHER PUBLICATIONS

Sorin et al. "Using tf-idf as an edge weighting scheme in user-object bipartie networks." Aug. 29, 2013. 22 pages.*

(Continued)

*Primary Examiner* — Kimberly L Wilson
(74) *Attorney, Agent, or Firm* — Fenwick & West LLP

(57) ABSTRACT

A social networking system recommends objects, such as pages, of the social networking system to users of the social networking system based on the location of the user. The social networking system obtains location information identifying the location of the user. Based on the location of the user, the social networking system identifies levels of geographical partitions encompassing the location of the user. For each level of geographical partitions, the social networking system accesses relevant objects of the social networking system with connections to users located within the level of geographical partitions. The social networking system may have determined a term frequency-inverse document frequency (tf-idf) value for each relevant object. Based on the number of connections and the tf-idf value associated with each relevant object, the social networking system merges the relevant objects accessed at each level into a set of relevant objects to recommend to the user.

20 Claims, 4 Drawing Sheets

(51) Int. Cl.
*H04L 29/08* (2006.01)
*G06F 16/29* (2019.01)
*G06F 16/2457* (2019.01)
*G06F 16/9537* (2019.01)

(52) U.S. Cl.
CPC ......... *G06F 16/9537* (2019.01); *G06Q 50/01* (2013.01); *H04L 67/02* (2013.01); *H04L 67/18* (2013.01); *H04L 67/306* (2013.01)

(58) Field of Classification Search
USPC .......................................................... 707/724
See application file for complete search history.

(56) References Cited

U.S. PATENT DOCUMENTS

| | | | | |
|---|---|---|---|---|
| 2013/0073686 | A1* | 3/2013 | Sandholm | G06Q 30/0631 709/219 |
| 2013/0332523 | A1* | 12/2013 | Luu | G06Q 30/0251 709/204 |
| 2014/0019233 | A1 | 1/2014 | Goder et al. | |
| 2014/0149372 | A1* | 5/2014 | Sankar | G06F 17/30864 707/706 |
| 2014/0156360 | A1 | 6/2014 | Shalita et al. | |
| 2014/0156566 | A1 | 6/2014 | Kabiljo et al. | |
| 2014/0156744 | A1 | 6/2014 | Hua et al. | |

OTHER PUBLICATIONS

Constine, Josh. "Facebook Gives Graph Search to More People, Makes Those Left Out Jealous." Feb. 21, 2013. http://techcrunch.com/2013/02/21/facebook-graph-search-sorting.*

Sorin, A. et al., "Using tf-idf as an edge weighting scheme in user-object bipartie networks." Aug. 29, 2013, 22 pages.

Constine, J., "Facebook Gives Graph Search to More people, Makes Those Left Out Jealous", Feb. 21, 2013, 16 pages. [Online] [Retrieved Apr. 3, 2016] Retrieved from the Internet <http://techcrunch.com/2013/02/21/facebook-graph-search-sorting/>.

United States Office Action, U.S. Appl. No. 14/296,369, dated Apr. 8, 2016, 17 pages.

* cited by examiner

RECOMMENDING OBJECTS TO A USER OF A SOCIAL NETWORKING SYSTEM BASED ON THE LOCATION OF THE USER

CROSS REFERENCE TO RELATED APPLICATIONS

This application is a continuation of U.S. application Ser. No. 14/296,369, filed Jun. 4, 2014, which is incorporated by reference in its entirety.

BACKGROUND

This invention generally relates to social networking systems, and more particularly to recommending objects or pages to new users of the social networking system.

A social networking system allows its users to connect to and interact with other social networking system users and with objects on the social networking system. As a user on a social networking system interacts with various objects (e.g., pages for businesses, content items posted on the social networking system, profiles of users on the social networking system, etc.), the user develops a history of interacting with objects. This interaction history also provides information about a user, including the user's interests. Based on these types of information associated with a user, the social networking system may recommend objects or pages to the user, encouraging the user to interact with the recommended objects. For example, if a user has "liked" or become a fan of certain types of pages on the social networking system in the past, the social networking system can recommend pages to that user that are similar to the ones the user has previously "liked."

However, for users new to the social networking system or with little or no information regarding tastes, preferences or connections, the social networking system is often unable to generate accurate recommendations of objects to provide to the users. Modern recommender systems that are often used by social networking systems typically use three types of recommendation strategies; user-user, item-item, and user-item. Each of these systems requires a model of a user to derive recommendations. For user-user recommender systems, the model must provide a similarity measurement between users. And for both item-item and user-item, the model must provide a set of previously rated entities for user. None of these foundations supports generating recommendations for a new users with little to no information stored in the social networking system. Hence users with little or no information stored with the social networking system provide a challenge for recommendation systems. This is sometimes referred to as the cold-start problem.

SUMMARY

The social networking system recommends objects, such as pages (e.g., pages representing businesses, brands, or organizations to which users can connect by, for example, "liking" the page), of the social networking system to users of the social networking system based on the location of the user. This allows the social networking system to provide recommendations to new users or users for whom there is little or no information stored in the social networking system, but for whom location information can be determined, since the system can leverage geographic location of the user to recommend objects related to that location. The social networking system obtains location information identifying the location of a user from, for example, location information from a user profile, from the user's client device, among other sources. Based on the location of the user, the social networking system identifies levels of geographical partitions encompassing the location of the user, such as neighborhoods, zip codes, cities, counties, regions, states, countries, etc. that encompass the user's primary residence to form a geographical hierarchy.

For each level of geographical partitions associated with the hierarchy, the social networking system identifies or accesses already identified relevant objects of the social networking system with one or more connections to users located within the level of geographical partitions (e.g., pages that have user fans that are in a particular zip code or city). In one embodiment, the social networking system determines relevant objects in a geographical partition using a term frequency-inverse document frequency (tf-idf) value for each relevant object. In one example, the tf-idf algorithm applied to determine a tf-idf value for an object locally relevant to a level of geographical partitions is modified to further bias towards identifying locally relevant objects, by normalizing the term frequency against the expected value of connections for a level of geographic partitions for example. Based on the number of connections and the tf-idf value associated with each relevant object, the social networking system can rank each relevant object. The social networking system may use a variety of techniques to merge the relevant objects at each level of geographical partitions into a single set of relevant objects. For example, the social networking system may select relevant objects having more than a threshold number of connections to users located with a level of geographical partitions to include in the set of relevant objects.

In another example, the social networking system 140 applies a machine learning algorithm to determine the relevant importance of each level of geographic partitions with respect to identifying and recommending relevant objects to a user. For example, the social networking system 140 applies a machine learning process to predict the probability of a user connecting with a relevant object (e.g., fanning a page) based on the demographic information associated with the relevant object and the user, engagement information associated with the relevant object, and/or the demographic information associated with one or more levels of geographic partitions associated with the relevant object. Based on the probability of a user connecting with the relevant objects, the social networking system 140 may merge the relevant objects into a single set of relevant objects. The social networking system may then select one or more relevant objects from the merged set of relevant objects to recommend to the user.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
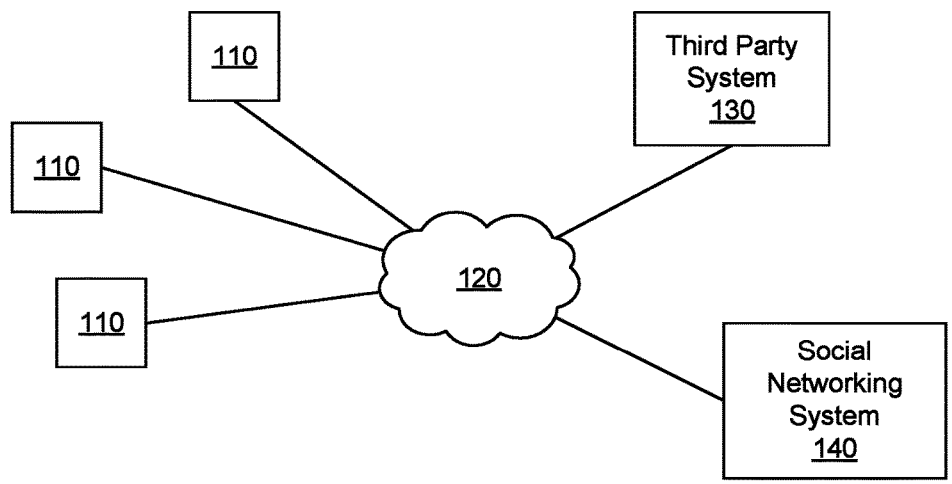
FIG. 1 is a block diagram of a system environment in which a social networking system operates, according to one embodiment.

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the social networking system 140, such as advertisements, content, or information about an application provided by the third party website 130.

Figure 2:
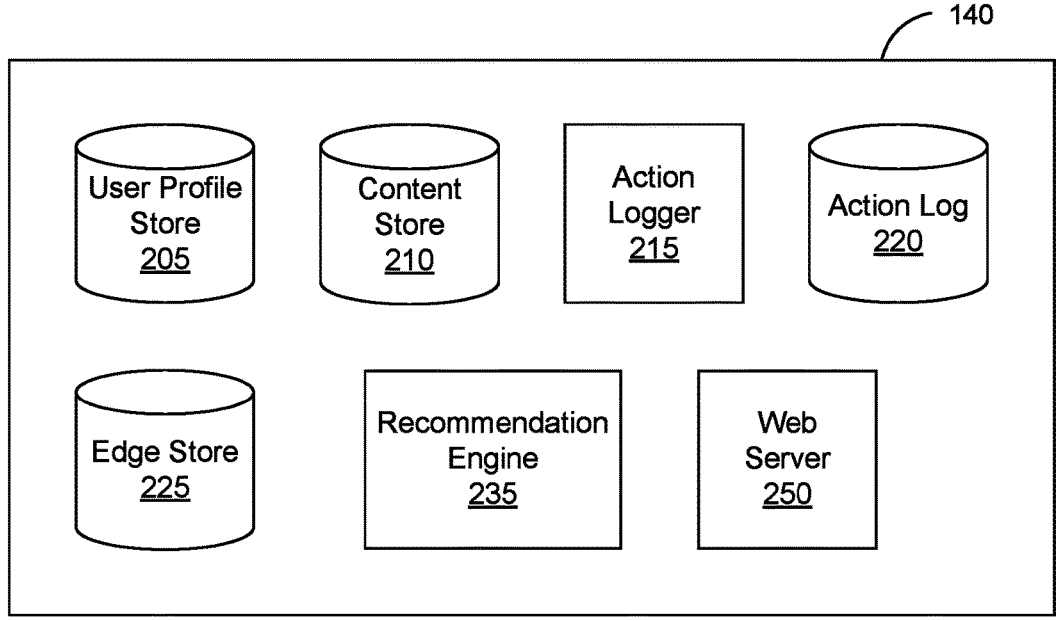
FIG. 2 is a block diagram of a social networking system, according to one embodiment.

FIG. 2 is an example block diagram of an architecture of the social networking system 140. The social networking system 140 shown in FIG. 2 includes a user profile store 205, a content store 210, an action logger 215, an action log 220, an edge store 225, a recommendation engine 235 and a web server 250. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding user of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

In one example, the user may provide to the social networking system 140 location information for the social networking system 140 to include in the user's user profile. The user may provide the social networking system 140 with a home or work address associated with the user's residence or work place, for example. In another example, the user may allow the social networking system 140 to ascertain location information associated with the user. For example, the user may give the social networking system 140 permission to retrieve location information associated with one or more devices used by the user. The social networking system 140, on receiving permission, may retrieve, for example, Global Positioning System (GPS) coordinates associated with a user's device. Based on the retrieved GPS coordinates, the social networking system 140 identifies the location associated with the user, and associates the location with the user's user profile stored in the user profile store 205. In one example, the social networking system 140 identifies the GPS coordinate at which the user's user device occupies the most time or more than a threshold amount of time and associates the location information determined from the GPS coordinate with the user's user profile.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, an event page, or any other type of content. Thus, the brand page described above can be an object within the social networking system. Social networking system users may create objects stored by the content store 210, such as status updates, photos tagged by users to be associated with other objects in the social networking system, events, groups, applications or pages representing an individual, group or business. In some embodiments, objects are received from third-party applications or third-party applications separate from the social networking system 140. In one embodiment, objects in the content store 210 represent single pieces of content, or content "items." Hence, users of the social networking system 140 are encouraged to communicate with each other by posting text and content items of various types of media through various communication channels. This increases the amount of interaction of users with each other and increases the frequency with which users interact within the social networking system 140.

The content store may also store one or more recommendation units. The social networking system provides recommendation units to its users to increase user interaction with the social networking system. A recommendation unit suggests one or more actions to a user viewing the recommendation unit (a "viewing user") to increase the viewing user's interaction with the social networking system. For example, a recommendation unit provides a suggestion for the viewing user to establish a connection with another user as well as a link enabling the user to do so. In other examples, a recommendation unit encourages the viewing user to invite a friend to an event, identify a friend in a photo, interact or view an object such as a page representing a local business, or perform another suitable action with the social networking system. Thus, a recommendation unit can provide a suggestion to a user to, for example, "like" a brand page for a business. Each recommendation unit is associated with a score based on a value of the viewing user interacting with the recommendation unit (i.e., "converting" the recommendation unit by performing the recommended action) and/or on the likelihood that the viewing user will convert the recommendation unit. The score may be based on prior interaction with recommendation units by the viewing user, other users to whom the viewing user is connected, a probability of the viewing user interacting with the recommendation unit, or other criteria. Determination of a score for a recommendation unit is further described in U.S. patent application Ser. No. 13/549,080, filed on Jul. 13, 2012, which is hereby incorporated by reference in its entirety. The social networking system selects one or more recommendation units to send to a user based at least in part on this score.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions are stored in the action log 210. Examples of interactions with objects include: commenting on posts, sharing links, and checking-in to physical locations via a mobile device, accessing content items, showing interest in pages by "fanning" or "liking" the pages and any other interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites, such as this sporting equipment retailer, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

Using data from the user profile store 205 and the edge store 225, the recommendation engine 235 identifies one or more objects to recommend to a user of the social networking system 140. The recommendation engine 235 identifies objects potentially relevant to a user, or objects that a user may be interested in interacting with on the social networking system 140. In one embodiment, the recommendation engine 235 retrieves data included in a user profile associated with a user, such as location information identifying the primary location occupied by a user, and recommends one or more objects to the user via one or more recommendation units, as further described below in conjunction with FIG. 3. In one embodiment, the recommendation engine 235 identifies objects stored in the content store that have explicit connections with one or more users (as determined from data in the edge store 225) located in geographical areas encompassing the location information associated with the user to whom the recommendation engine is recommending objects. The recommendation engine 235 ranks the identified objects and selects one or more of the ranked objects to recommend to the user via recommendation units.

The web server 250 links the social networking system 140 via the network 120 to the one or more client devices 110, as well as to the one or more third party systems 130. The web server 140 serves web pages, as well as other web-related content, such as JAVA®, FLASH®, XML and so forth. The web server 250 may receive and route messages between the social networking system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, WEBOS® or RIM®.

Recommending Objects to a User

Figure 3A:
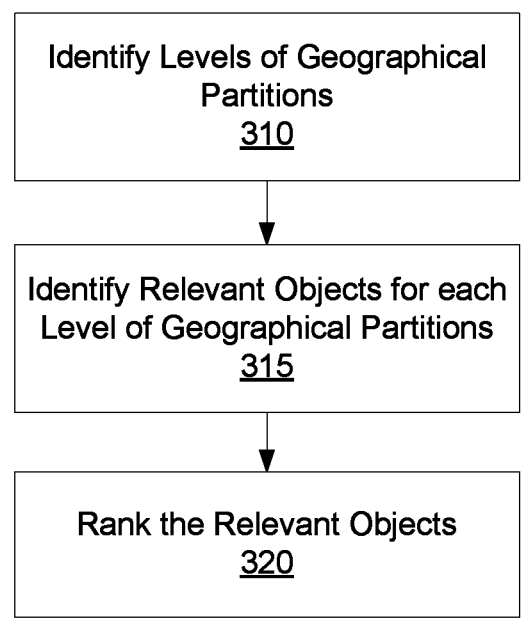
FIG. 3a and FIG. 3b are flow charts of a method for recommending objects to a user of a social networking system, according to one embodiment.
Figure 3B:
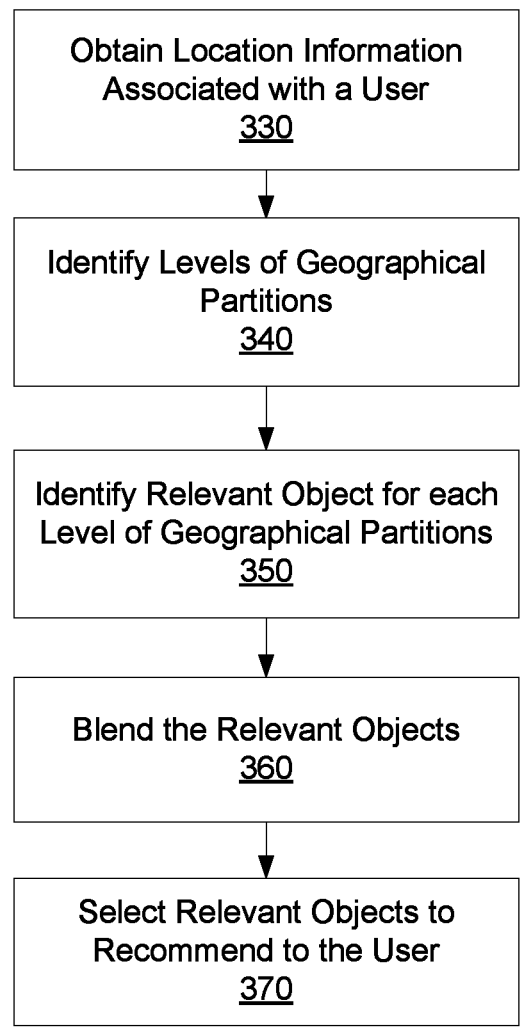

FIG. 3a and FIG. 3b are flow charts of one embodiment of a method for recommending objects to a user of a social networking system. In one embodiment, the functionality described in conjunction with FIG. 3a and FIG. 3b is performed by the recommendation engine 235; however, in other embodiments, any suitable component or combination of components may provide the functionality described in conjunction with FIG. 3a and FIG. 3b. Additionally, in some embodiments, different and/or additional steps than those identified in FIG. 3a and FIG. 3b may be performed or the steps identified in FIG. 3a and FIG. 3b may be performed in different orders.

FIG. 3a is a flowchart illustrating an example method for identifying and ranking relevant objects located within a level of geographical partitions. The social networking system 140 identifies levels of geographical partitions encompassing a geographical area. A level of geographical partitions refers to a geographical area, having a specific resolution or granularity, and encompassing a geographical location. For example, a zip code, a city that includes the zip code, a region or province that includes the city, and the state that includes the region might all be different geographical partitions that essentially form a hierarchy of levels. Multiple zip codes would represent a single level of geographical partitions, with each zip code having specific dimensions, geographical properties and being partitioned from other zip codes. The multiple zip codes may belong to a single state, thereby making the state the level of geographical partitions within which the multiple zip codes are located. Similarly, neighborhoods, counties, states and countries are examples of different levels of geographical partitions, as they represent different resolutions or granularities of a geographical area.

For each level of geographical partitions, the social networking system 140 identifies 315 relevant objects, such as pages. The relevant objects represent objects that one located within a geographical partition, such as a zip code, would find relevant, or objects with which one would be interested in interacting. New users joining the social networking system 140, who have not yet expressed an interest in a variety of objects within the social networking system 140, may be interested in interacting with objects in which users of the social networking system 140 located within or near the new user's location have shown an interest.

In one embodiment, for each level of geographical partitions, the social networking system 140 identifies 315 objects in the content store 210 having location information within the geographical partition. For example, the social networking system 140 identifies objects in the content store 210 having locations within a state as objects relevant to users within the state. A business page of a restaurant might be one example of an object that has location information within a geographical partition. Specifically, the business/ restaurant in this example might be located within a particular zip code, and hence has location information within that zip code.

In another embodiment, for each level of geographical partitions, the social networking system 140 identifies objects in the content store 210 that have explicit connections with one or more users of the social networking system 140, and the one or more users are located within the level of geographical partitions. For example, for an identified zip code (level of geographical partitions), the social networking system 140 identifies objects that have explicit connections to one or more users located within the identified zip code, such as users who have "liked" the object. Similarly, for an identified state (level of geographical partitions), the social networking system 140 identifies objects that have explicit connections to one or more users located within the state. For each level of geographical partitions the social networking system 140 may identify 315 objects having more than a threshold number of connections to users located in the level of geographical partitions as relevant objects. In addition to identifying 315 relevant objects for each level of geographical partitions, the social networking system may also associate the object with an identifier, the identifier identifying the level of geographical partitions from which the relevant object was identified or determined.

Apart from identifying relevant objects associated with a geographic partition or a level of geographic partitions, based on a threshold number of connections associated with an object, the social networking system 140 may use one or more algorithms to identify objects that are more relevant to the level of geographical partitions as opposed to globally. It is possible that objects with strong regional connections are more compelling connections to a new user than globally popular but not regionally relevant objects. For example, objects may have connections to users located in a variety of locations in addition to users located within a geographical location. The social networking system 140 may identify objects with a greater proportion of connections to users located within a geographical partition or a level of geographical partitions as objects relevant to the level of geographical partitions. In one example, the social networking system 140 applies the term frequency-inverse document frequency (tf-idf) algorithm to identify objects specifically relevant to a level of geographical partitions. The document frequency identifies how unique an object is to a level of geographical partitions (for example, objects that appear in a few locations within a level of geographical partitions are considered as unique).

For each level of geographic partitions, the social networking system 140 identifies objects having connections to users located within the level of geographic partitions (e.g., pages that have been fanned within a given zip code). For each identified object, the social networking system 140 determines a term frequency and an inverse document frequency. The term frequency for an object is determined based on the number of connections between the object and users located within the level of geographic partitions (e.g., the fan frequency for a page). The inverse document frequency is the number of locations within a level of geographical locations, such as zip codes within a state or states within a country, with at least one user that has a connection with the object (e.g., the number of zip codes in which the page has been fanned). The tf-idf value assigned to the document is the product of the term frequency and the inverse document frequency. For example, for a zip code, the social networking system 140 identifies pages having connections to users located within the zip code. For each of the pages, the social networking system 140 determines a term frequency, which is the number of connections between the page and users located within the zip code, and an inverse document frequency, which is the number of locations within the zip code with at least one user connected to the page. The tf-idf value assigned to each page is then the product of the term frequency of the page and the inverse document frequency of the page.

The following equations outline an exemplary process for determining the tf-idf value assigned to an object. The variables used in the equations are defined as: tf refers to term frequency, idf refers to the document frequency, c refers to locations within a level of geographical locations, u refers to the users, p refers to objects, and G refers to a level of geographical locations. The term frequency is determined using the following equation:

$$tf(p,c) = |\{u \in c : u \text{ connections } p\}| \qquad (1)$$

The inverse document frequency is determined using the following equation:

$$idf(p, G) = \log \frac{\|G\|}{|\{c \in G : \exists u \in c \text{ such that } u \text{ connected to } p\}|} \qquad (2)$$

The tf-idf value assigned to an object is the product of the term frequency and the inverse document frequency.

In one embodiment, the tf-idf algorithm applied to identify objects locally relevant to a level of geographical partitions is modified to further bias towards identifying locally relevant objects, by normalizing the term frequency against the expected value of connections for a level of geographic partitions. The modified term frequency identifies how locally popular an object is to the users within a level of geographical partitions, while the document frequency identifies how unique an object is to a level of geographical partitions (for example, objects that appear in a few levels of geographical partitions are considered as unique). For example, the term frequency for an object with respect to a particular zip code, may be normalized by the expected number of connections for that zip code. The expected number of connections may be determined by dividing the total number of connections associated with an object, by the number of zip codes including users connected to the object. Below is an example equation for determining the modified term frequency (tf').

$$tf'(p, c) = \frac{tf(p, c)}{\log \frac{F(p)}{|\{c \in G : \exists u \in c \text{ such that } u \text{ connected to } p\}|}} \qquad (3)$$

where F(p) refers to the total number of connections associated with an object across all levels of geographical partitions, and locations within all the levels of geographical partitions. A modified tf-idf value may then be calculated by determining the product of the modified term frequency value (tf') and the inverse document frequency (idf) associated with an object.

In one embodiment, the social networking system 140 identifies objects that are unique to a level of geographical partitions to recommend to users based on the locality associated with the object. For example, the social networking system 140 may identify thresholds associated with the local popularity (LP) of an object, and a document frequency (DF) associated with the object. Based on the thresholds the social networking system 140 filters out objects which do not meet the LP and DF thresholds. In one example, the thresholds are determined empirically. The LP associated with an object may be determined by identifying the number of connections associated with an object from a level of geographical partitions. The document frequency characterizes how unique an object is to a level of geographical partitions. Below is an example equation to determine the document frequency associated with an object.

$$DF(p, c) = \frac{\|G\|}{|\{c \in G : \exists\, u \in c \text{ such that } u \text{ connected to } p\}|} \quad (4)$$

where, c refers to locations within a level of geographical locations, u refers to the users, p refers to objects, and G refers to a level of geographical locations. Based on the LP and DF thresholds the tf-idf values associated with an object may be determined using the example function below:

$$tfidf(p, c) = \quad (5)$$
$$\begin{cases} tf(p, c) * idf(p, G(c)), & \text{if } tf(p, c) \geq LP \text{ or } DF(p, c) \leq DF \\ 0, & \text{if } tf(p, c) < LP \text{ and } DF(p, c) > DF \end{cases}$$

In one embodiment, the social networking system 140 ranks 320 the relevant objects associated with a level of geographical partitions. The social networking system 140 may use a variety of ranking techniques to rank 320 the relevant objects. In one embodiment, the social networking system 140 ranks the relevant objects within a level of geographical partitions based on the number of connections associated with a relevant object. For example, within a zip code, relevant objects with a larger number of connections to users located within the zip code are given a higher rank (e.g., pages fanned by more users are ranked higher). In another embodiment, the social networking system 140 ranks the relevant objects within a level of geographical partitions based on the tf-idf value associated with a relevant object. In one embodiment, the social networking system stores an identifier identifying the rank and level of geographical partitions associated with a relevant object in the content store 210. In another embodiment, the social networking system 140 stores the ranked relevant objects for each level of geographical partitions in the content store 210.

FIG. 3*b* is a flowchart illustrating an example process for recommending relevant objects to users of the social networking system. The social networking system 140 obtains 330 location information identifying the location of a user. The social networking system 140 may retrieve the location information associated with the user profile of the user from the user profile store 205. For example, the social networking system may retrieve the user's residential or primary address associated with the user's user profile. Alternatively, the social networking system 140 may retrieve the location of the user's device being used to access the social networking system, on receiving permission from the user, and infer from the location of the user's device the location of the user. Examples of location information that may identify the location of the user's device include GPS coordinates or an IP address. The social networking system may then infer from the GPS coordinates or the IP address the location of the user, for example a zip code encompassing the GPS coordinates. The user might also be associated with more than one location (e.g., a work location, a home location, etc.) such that the user could, for example, be associated with more than one zip code. In this case, the social networking system 140 may pick one of the locations or use more than one location in recommending objects to the user.

Based on the location information identifying the location of a user, the social networking system 140 may identify 340 one or more levels of geographical partitions associated with the user. In one example, the location information associated with the user is an address to a residence including a zip code value. Based on the zip code value, the social networking system 140 identifies 340 additional zip codes adjacent to the zip code as well as the county, and state within which the zip code value is located. The social networking system may also identify counties and states adjacent to the identified county and state within which the zip code value is located.

For each level of geographical partitions associated with the user, the social networking system 140 identifies 350 relevant objects, such as pages, to recommend to the user. The relevant objects represent objects that one located within a geographical partition, such as a zip code, would find relevant or objects with which one would be interested in interacting. In one embodiment, the social networking system 140 accesses or retrieves the pre-ranked relevant objects for each level of geographical partitions encompassing the location of the user, stored in the content store 210. In another embodiment, the social networking system 140 identifies relevant objects for each level of geographical partitions using the process described with respect to FIG. 3*a* above. Thus, the system 140 can perform the ranking at the time of determining a recommendation for a user or can perform the ranking in advance and simply retrieve or accesses pre-ranked objects for each level. In some embodiments, the system 140 re-ranks the objects each time it provides a recommendation to the user to get the most up-to-date ranking.

The social networking system 140 blends 360 or merges 360 the ranked relevant objects at each level of geographical partitions to generate a single set of relevant objects to recommend to the user. A number of techniques may be applied to blend or merge the relevant objects identified at each level of geographical partitions. For example, the social networking system 140 may merge a threshold number of relevant objects from each level of geographical partitions based on the rank associated with each relevant object. For instance, the social networking system may merge the top 5 tf-idf ranked relevant objects at each level of geographical partitions into a set of relevant objects to recommend to the user. In one example, the social networking system 140 may leverage a Bayesian process analyzing the recent historical performance of the ranked relevant objects at each level of geographical partitions, or at locations within each level of geographical partitions (e.g. user fanning history over the past 90 days) to remove locally relevant objects which do not meet a certain threshold, such as the number of connections associated with the relevant object. The social networking system 140 may then blend or merge the remaining objects into a single set of relevant objects to recommend to the user.

In one embodiment, the social networking system 140, assigns the relevant objects with a weighted rank based on a weight assigned to a location within a level of geographical partitions. This results in the social networking system 140 merging and ranking the various relevant objects associated with the different levels of geographical partitions, by assigning a weight to locations associated with one or more users who are connected to the relevant objects. This approach has value for a number of reasons. First, small regions have smaller samples and by the de Moivre equation this leads to high variance in the measured number of connections to objects. As the coarseness of the partitions increases, the number of samples increase which leads to a decrease in the variance of the number of connections to an object. Thus, it may be beneficial to blend the results from the different levels of geographical locations to reduce the deficiencies that occur due to either a high variance or low variance in the number of connections to an object. By associating a weight with a location within each level of geographical partitions, locally relevant objects may be ranked higher than globally relevant objects during the blending of the relevant objects identified at each level of geographical partitions.

The following is one example of an equation used to determine a weighted rank for an identified relevant object. The variables are defined as: r refers to the rank, i refers to the level of geographical locations, c refers to locations within the level of geographical locations, u refers to the number of users, p refers to objects, w refers to the weight associated with any location within the level of geographical locations, and P refers to the frequency distribution associated with a location within the level of geographical partitions. The rank is determined using the following equation:

$$r(u, p) = \sum_i w_i * P_{c_i(u)}(p) + \lambda * \sum_i w_i^2 \qquad (6)$$

Similarly a tf-idf weighted rank may be assigned to an object based on the weight assigned to a location within a level of geographical partitions. Let $w_i^{tfidf}$ be a weight associated with any location within the level of geographical location i for a recommendation identified by tf-idf. The tf-idf weighted rank for a relevant object may be calculated by using equation (6), by replacing $w_i$ with $w_i^{tfidf}$.

In one embodiment, the social networking system 140 blends 360 the relevant objects by ranking the relevant objects from the various levels of geographic partitions based on a combination of the number of connections associated with the relevant objects within a level of geographical partitions and the tf-idf value associated with the relevant objects. In another embodiment, the social networking system 140 blends 360 the relevant objects based on the paths between locations within levels of geographical partitions as defined by a hierarchical graph or tree. As the hierarchy is a tree there is a unique path between any two locations within a level of geographical partitions. One example, method of ranking the relevant objects is discussed below. This path first ascends the hierarchy between locations (referred to as below) in a sub path then it descends the hierarchy in a sub path between locations (referred to as $t_j$, below). Let $a_{i,j}$ be defined as a constant weight value for ascending between partitions levels $G_i$ and $G_j$, and let $b_{i,j}$ be a defined as a constant weight value for descending between partition levels $G_j$ and $G_i$. Then we have a graph distance d between any two locations c and c' defined as:

$$d(c, c') = \sum_{0<i<n} a_{G(s_i), G_{(s_i+1)}} + \sum_{m>i>0} b_{G(t_i), G_{(t_i-1)}} \qquad (7)$$

From this a ranking function may be defined as:

$$r(u, p) = \sum_{c' \in H} d(c(u), c') * P_{c'}(p) \qquad (8)$$

where, H is the hierarchy of levels of geographic partitions and P refers to the frequency distribution associated with a location within the level of geographical partitions. Similarly, ranking or blending functions can be defined based on the tf-idf values assigned to each relevant object.

In another embodiment, the social networking system 140 may perform a secondary ranking of the blended relevant objects based on information associated with the user profile, the relevant object or the demographic with which the user is associated. For example, the social networking system 140 further ranks the blended relevant objects based on the marital status, age, or gender of the user, and the demographic of the users connected to the relevant objects.

The social networking system 140 may also use a machine learning algorithm to blend and rank the relevant objects. The machine learning algorithm may be trained using one or more data sets including ranked relevant objects for users located in different locations. For example, the machine learning algorithm determines a probability of a user interacting with relevant objects for each level of geographic partitions based on the demographic information associated with the relevant object and the user, engagement information associated with the relevant object, the demographic information associated with one or more levels of geographic partitions associated with the relevant object, or the number of connections associated with a relevant object within a given level of geographic partitions. Based on the probability determined, the social networking system 140 may rank the relevant objects and blends the relevant objects into a single set of relevant objects.

The social networking system 140 then selects 370 relevant objects to recommend to the user from the set of blended relevant objects to recommend to the user. In one embodiment, the social networking system 140 selects relevant objects based on the rank of the relevant objects in the blended set of relevant objects. For example, the social networking system 140 selects 370 the top 20 ranked relevant objects in the set of blended relevant objects to recommend to the user. The social networking system 140 recommends the selected relevant objects to the user via one or more recommendation units.

The selected relevant objects for a user can then be presented for display to a user in the social networking system 140. In one embodiment, the system 140 selects the highest ranked objects from the merged set of objects (e.g., the top 20 or top 50). The social networking system 140 might provide a newsfeed to the user and somewhere on the page that includes the news feed (e.g., in a side margin), the system can provide a list of recommended objects for the user. For example, the user's newsfeed page in the social networking system 140 might include a "Pages you Might Like" section in a margin along the side of the page or as a newsfeed item within the news feed. This recommendations section can provide a list of all of the selected relevant objects or pages, or a top few pages. In addition, the social networking system 140 might show a first few of the recommended pages, and then when the user refreshes the page or navigates to a new page, the system 140 might show the next few of the recommended pages. If the social networking system 140 has identified 50 total recommended pages for the user, the system 140 can continue to cycle through this list until all recommendations have been provided. The system 140 can also occasionally re-determine the top pages if a certain amount of time has passed or it is determined that a new ranking should be performed to get a new set of recommended pages.

Figure 4:
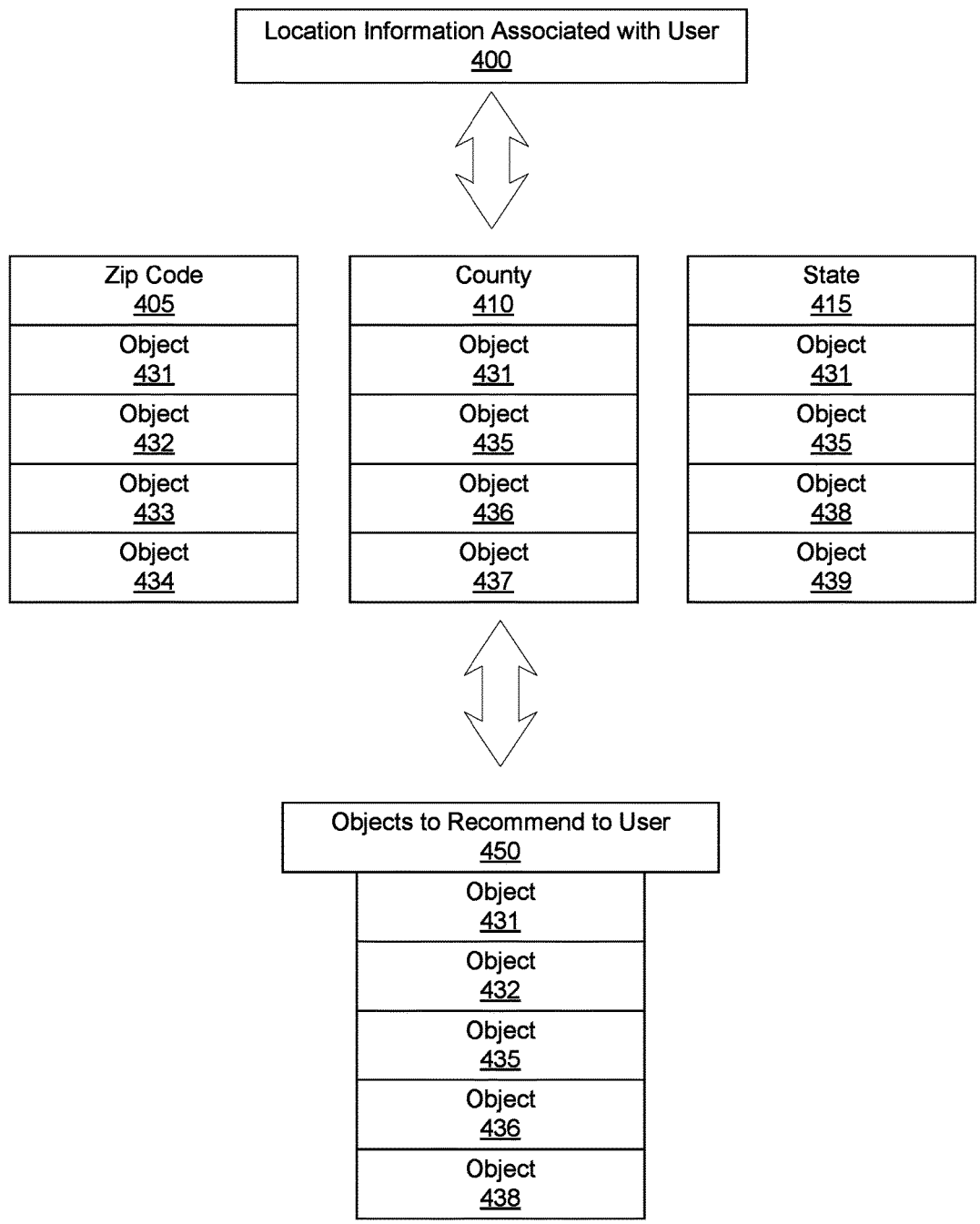
FIG. 4 is an example of recommending objects to a user of a social networking system, according to one embodiment.

FIG. 4 is an example of recommending objects to a user of a social networking system, according to one embodiment. The social networking system 140 obtains the location information associated with the user 400, as described in conjunction with FIG. 3 above. Based on the location information of the user 400, the social networking system 140 identifies levels of geographical partitions encompassing the location of the user, and for each level of geographical partitions the social networking system 140 retrieves, accesses or identifies relevant objects, as described in conjunction with FIG. 3 above. In this example, the social networking system 140 identifies 3 levels of geographic partitions, a zip code 405 level, a county level 410, and a state 415 level.

For the zip code 405 level the social networking system accesses relevant objects 431, 432, 433 and 434 from the content store 210. For the county 410 level the social networking system 140 accesses relevant objects 431, 435, 436, and 437 from the content store 210. For the state 415 level the social networking system 140 accesses relevant objects 431, 435, 438 and 439 from the content store 210. The social networking system 140 then blends and ranks the relevant objects as described in conjunction with FIG. 3 above. For example, the social networking system 140 may leverage a Bayesian process analyzing the recent historical performance of the ranked relevant objects at each level of geographical partitions, to remove locally relevant objects which do not meet a certain threshold. The social networking system 140 may then blend or merge the remaining objects into a single set of relevant objects 450 to recommend to the user. In this example, the social networking system 140 merges and selects objects 431, 432, 435, 436 and 438 to recommend 450 to the user.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
obtaining, by a social networking system having one or more computing devices, location information identifying a location of a user of a social networking system;
identifying, by the social networking system, based on the location information, one or more levels of geographical partitions that are associated with the user, each level representing a geographical area encompassing the location of the user identified by the location information, each level of geographic partitions being within a hierarchy of levels of geographic partitions;
accessing, by the social networking system, for each level of geographical partitions associated with the user, relevant objects, each relevant object connected to a number of users of the social networking system, wherein the relevant object has location information identifying a location within the level of geographical partitions;
merging, by the social networking system, the relevant objects accessed at each of the levels of geographical partitions associated with the user, wherein the merging is based on a computed rank of each of the relevant objects, wherein the computed rank of each relevant object that is within a geographical partition is proportional to a number of edges stored in the social networking system that connect the relevant object with user profiles that are within the geographical partition, the user profiles stored in the social networking system, and wherein each of the levels of geographic partitions have location information identifying a location of the user within that level of geographical partitions; and
selecting, by the social networking system, one or more of the merged relevant objects for presentation to the user.

2. The method of claim 1, wherein obtaining location information identifying the location of a user comprises retrieving the location information from a user device used by the user.

3. The method of claim 1, further comprising:
identifying a term frequency-inverse document frequency value associated with each of the accessed relevant objects, the term frequency-inverse document frequency value determined based on the number of users connected to each relevant object and a number of locations within the levels of geographical partitions including a user of the social networking system who is connected to the object; and
merging the relevant objects accessed at each level based on the term frequency-inverse document frequency associated with each relevant object.

4. The method of claim 3 further comprising:
ranking the accessed relevant objects based on the term frequency-inverse document frequency associated with each relevant object; and
merging the relevant objects based on the rank associated with each relevant object.

5. The method of claim 3 further comprising:
ranking the accessed relevant objects based on a weight associated with a location within the level of geographical locations, the location having been identified from the location information of users connected to the relevant object; and
merging the relevant objects accessed at each level based on the rank associated with each accessed relevant object.

6. The method of claim 5 wherein the weight associated with a location is based on the term frequency-inverse document frequency associated with the relevant object.

7. The method of claim 3 further comprising:
ranking the accessed relevant objects based on a distance between locations within the levels of geographical locations based on paths between the locations in a hierarchical graph or tree; and
merging the relevant objects based on the rank associated with each relevant object.

8. The method of claim 1 further comprising:
identifying accessed relevant objects at each level with greater than a threshold number of connections; and
merging the identified accessed relevant objects with greater than the threshold number of connections.

9. The method of claim 1, wherein the computed rank of each relevant object is further based on an a probability of the user interacting with the relevant objects for each of the levels of geographic partitions, as computed by a machine learning algorithm, wherein the machine learning algorithm is trained using ranked relevant objects for users located in different locations, and wherein the machine learning algorithm determines the probability based on at least one of demographic information associated with the relevant object and the user, engagement information associated with the relevant object, and demographic information associated with one or more levels of geographic partitions associated with the relevant object.

10. A non-transitory computer program product comprising a computer-readable storage medium containing computer program code for:
obtaining, by a social networking system having one or more computing devices, location information identifying a location of a user of a social networking system;
identifying, by the social networking system, based on the location information, one or more levels of geographical partitions that are associated with the user, each level representing a geographical area encompassing the location of the user identified by the location information, each level of geographic partitions being within a hierarchy of levels of geographic partitions;
accessing, by the social networking system, for each level of geographical partitions associated with the user, relevant objects, each relevant object connected to a number of users of the social networking system, wherein the relevant object has location information identifying a location within the level of geographical partitions;
merging, by the social networking system, the relevant objects accessed at each of the levels of geographical partitions associated with the user, wherein the merging is based on a computed rank of each of the relevant objects, wherein the computed rank of each relevant object that is within a geographical partition is proportional to a number of edges stored in the social networking system that connect the relevant object with user profiles that are within the geographical partition, the user profiles stored in the social networking system, and wherein each of the levels of geographic partitions have location information identifying a location of the user within that level of geographical partitions; and
selecting, by the social networking system, one or more of the merged relevant objects for presentation to the user.

11. The computer program product of claim 10, wherein obtaining location information identifying the location of a user comprises retrieving the location information from a user device used by the user.

12. The computer program product of claim 10, further comprising:
identifying a term frequency-inverse document frequency value associated with each of the accessed relevant objects, the term frequency-inverse document frequency value determined based on the number of users connected to each relevant object and a number of locations within the levels of geographical partitions including a user of the social networking system who is connected to the object; and
merging the relevant objects accessed at each level based on the term frequency-inverse document frequency associated with each relevant object.

13. The computer program product of claim 12, further comprising:
ranking the accessed relevant objects based on the term frequency-inverse document frequency associated with each relevant object; and
merging the relevant objects based on the rank associated with each relevant object.

14. The computer program product of claim 12, further comprising:
ranking the accessed relevant objects based on a weight associated with a location within the level of geographical locations, the location having been identified from the location information of users connected to the relevant object; and
merging the relevant objects accessed at each level based on the rank associated with each accessed relevant object.

15. The computer program product of claim 14, wherein the weight associated with a location is based on the term frequency-inverse document frequency associated with the relevant object.

16. The computer program product of claim 12, further comprising:

ranking the accessed relevant objects based on a distance between locations within the levels of geographical locations based on paths between the locations in a hierarchical graph or tree; and merging the relevant objects based on the rank associated with each relevant object.

17. The computer program product of claim 10, further comprising:

identifying accessed relevant objects at each level with greater than a threshold number of connections; and merging the identified accessed relevant objects with greater than the threshold number of connections.

18. A system comprising:

a processor;

a non-transitory computer readable storage medium, comprising instructions, that when executed by the processor, cause the processor to:

obtain, by a social networking system having one or more computing devices, location information identifying a location of a user of a social networking system;

identify, by the social networking system, based on the location information, one or more levels of geographical partitions that are associated with the user, each level representing a geographical area encompassing the location of the user identified by the location information, each level of geographical partitions being within a hierarchy of levels of geographical partitions;

access, by the social networking system, for each level of geographical partitions associated with the user, relevant objects, each relevant object connected to a number of users of the social networking system, wherein the relevant object has location information identifying a location within the level of geographical partitions;

merge, by the social networking system, the relevant objects accessed at each of the levels of geographical partitions associated with the user, wherein the merging is based on a computed rank of each of the relevant objects, wherein the computed rank of each relevant object that is within a geographical partition is proportional to a number of edges stored in the social networking system that connect the relevant object with user profiles that are within the geographical partition, the user profiles stored in the social networking system, and wherein each of the levels of geographic partitions have location information identifying a location of the user within that level of geographical partitions; and select, by the social networking system, one or more of the merged relevant objects for presentation to the user.

19. The system of claim 18, the non-transitory computer readable storage medium comprising further instructions, that when executed by the processor, cause the processor to:

identify a term frequency-inverse document frequency value associated with each of the accessed relevant objects, the term frequency-inverse document frequency value determined based on the number of users connected to each relevant object and a number of locations within the levels of geographical partitions including a user of the social networking system who is connected to the object;

rank, for each level, the accessed relevant objects based on the term frequency-inverse document frequency value associated with each of the accessed relevant objects; and merge the relevant objects based on the rank associated with each relevant object.

20. The system of claim 18, the non-transitory computer readable storage medium comprising further instructions, that when executed by the processor, cause the processor to:

identify a term frequency-inverse document frequency value associated with each of the accessed relevant objects, the term frequency-inverse document frequency value determined based on the number of users connected to each relevant object and a number of locations within the levels of geographical partitions including a user of the social networking system who is connected to the object;

rank, for each level, the accessed relevant objects based on a weight associated with a location within the level of geographical locations, the location having been identified from the location information of users connected to the relevant object, the weight associated with a location based on the term frequency-inverse document frequency value associated with the accessed relevant objects; and merge the relevant objects based on the rank associated with each relevant object.

* * * * *